(12) United States Patent  (10) Patent No.: US 9,106,944 B2
Bae  (45) Date of Patent: Aug. 11, 2015

(54) DISPLAY APPARATUS AND CONTROL METHOD THEREOF

(75) Inventor: Simon Bae, Yongin-si (KR)

(73) Assignee: SAMSUNG ELECTRONIC CO., LTD., Suwon-si (KR)

( * ) Notice: Subject to any disclaimer, the term of this patent is extended or adjusted under 35 U.S.C. 154(b) by 209 days.

(21) Appl. No.: 13/586,433

(22) Filed: Aug. 15, 2012

(65) Prior Publication Data

US 2013/0050073 A1 Feb. 28, 2013

(30) Foreign Application Priority Data

Aug. 23, 2011 (KR) .................... 10-2011-0083749

(51) Int. Cl.
*H04N 21/422* (2011.01)
*H04N 21/41* (2011.01)
*H04N 21/4223* (2011.01)
*H04N 21/485* (2011.01)

(52) U.S. Cl.
CPC ......... *H04N 21/422* (2013.01); *H04N 21/4126* (2013.01); *H04N 21/4223* (2013.01); *H04N 21/42203* (2013.01); *H04N 21/485* (2013.01)

(58) Field of Classification Search
USPC ........ 345/156; 348/207.1, 558, 734; 381/110; 704/275, 246
See application file for complete search history.

(56) References Cited

U.S. PATENT DOCUMENTS

| 5,774,859 A | * | 6/1998 | Houser et al. ................. 704/275 |
| 2009/0167946 A1 | * | 7/2009 | Samada et al. ................. 348/558 |
| 2009/0243874 A1 | * | 10/2009 | Sato ......................... 340/825.22 |
| 2010/0157168 A1 | * | 6/2010 | Dunton et al. ................. 348/734 |
| 2012/0316876 A1 | * | 12/2012 | Jang et al. ..................... 704/246 |

FOREIGN PATENT DOCUMENTS

EP 1 441 471 A2 7/2004

OTHER PUBLICATIONS

Communication dated Dec. 5, 2012 issued by the European Patent Office in counterpart European Patent Application No. 12167928.6.

* cited by examiner

*Primary Examiner* — Dwayne Bost
*Assistant Examiner* — Sepehr Azari
(74) *Attorney, Agent, or Firm* — Sughrue Mion, PLLC

(57) ABSTRACT

A display apparatus and a control method thereof are provided. The display apparatus includes: a signal receiver which receives an input signal corresponding to a user's input, from at least one of a plurality of input devices receiving the user's input; a display unit which displays thereon information on the plurality of input devices; and a controller which identifies whether the plurality of input devices are capable of receiving the user's input, and displays on the display unit connection information displaying at least one of the plurality of input devices which is capable of receiving the user's input. Accordingly, information on a plurality of input devices which are capable of controlling the display apparatus are displayed on the apparatus.

21 Claims, 7 Drawing Sheets

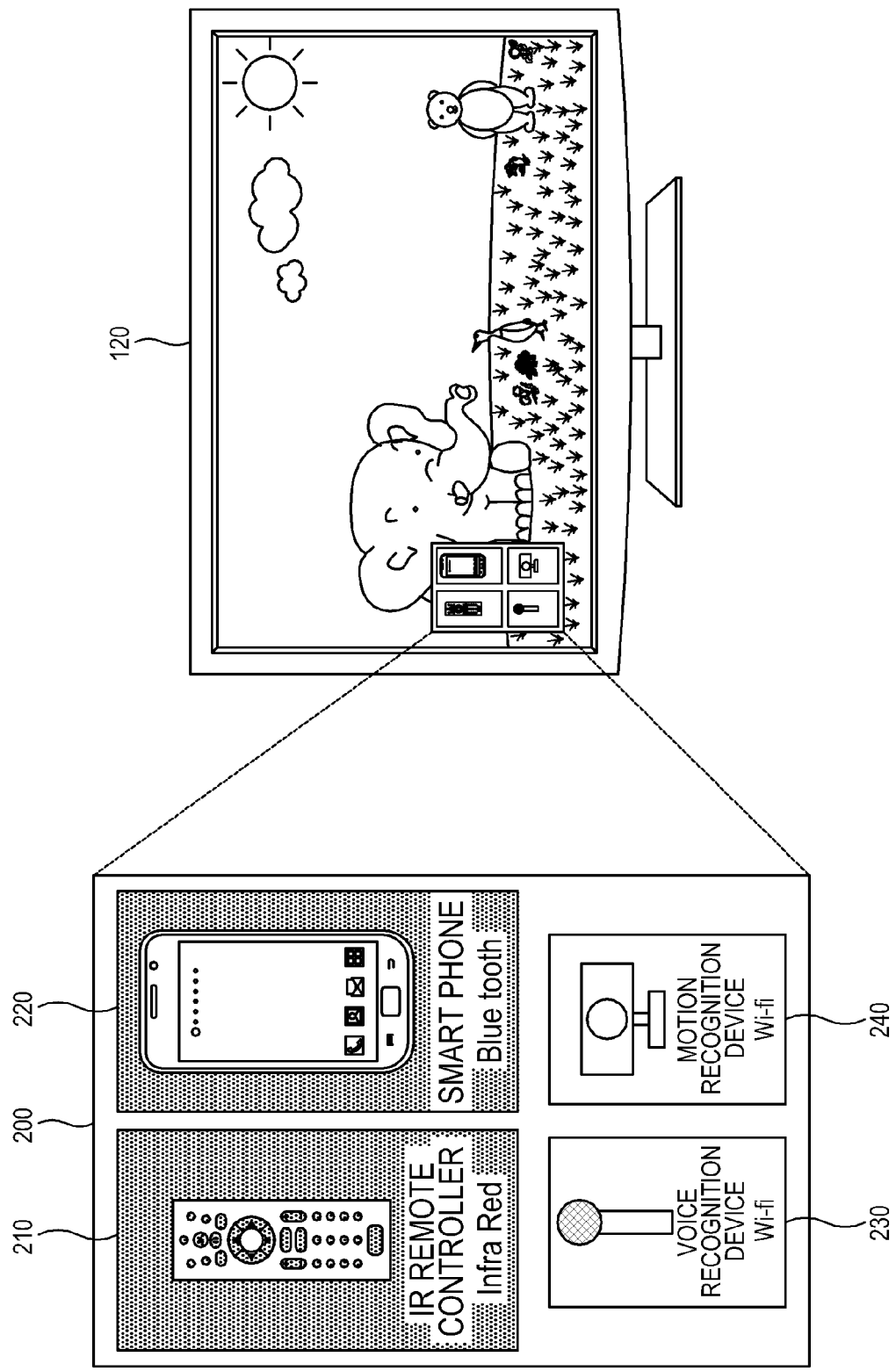

DISPLAY APPARATUS AND CONTROL METHOD THEREOF

CROSS-REFERENCE TO RELATED APPLICATION

This application claims priority from Korean Patent Application No. 10-2011-0083749, filed on Aug. 23, 2011 in the Korean Intellectual Property Office, the disclosure of which is incorporated herein by reference.

BACKGROUND

1. Field

Apparatuses and methods consistent with the exemplary embodiments relate to a display apparatus and a control method thereof, and more particularly, to a display apparatus and a control method thereof which receives an input signal from various input devices.

2. Description of the Related Art

A display apparatus processes an image signal or image data, which is input from the outside or stored therein, by various processes, and displays an image on a panel or a screen. The display apparatus varies by a display type, including a TV, a monitor, a portable media player (PMP), etc. According to recent technological developments, the display apparatus may provide various functions, and a demand for more types of commands to be input by a user through an input device has increased to use the various functions provided by the display apparatus.

Therefore, in addition to an infrared (IR) remote controller as an example of a conventional remote input device, a user's input signal may be transmitted by various communication types such as Bluetooth, Wifi or Zigbee through various input devices including smart phone, PDA, voice recognition device, motion recognition device, etc.

However, the display apparatus does not display input signals even if a plurality of input devices may transmit such signals from a remote distance to a single display apparatus. As a result, a user does not receive information regarding an available input device, causing great inconvenience to the user.

SUMMARY

Accordingly, one or more exemplary embodiments provide a display apparatus and a control method thereof which displays information regarding a plurality of input devices which are capable of controlling the display apparatus, thus providing convenience for a user.

The foregoing and/or other aspects may be achieved by providing a display apparatus including: a signal receiver which receives an input signal corresponding to a user's input, from at least one of a plurality of input devices receiving the user's input; a display unit which displays thereon information regarding the plurality of input devices; and a controller which identifies whether the plurality of input devices are capable of controlling the display apparatus through the user's input, and displays on the display unit connection information displaying at least one of the plurality of input devices which is capable of controlling the display apparatus through the user's input.

The connection information may include a plurality of user interface (UI) objects corresponding to each of the plurality of input devices, and the controller may display on the display unit the UI object corresponding to the input device capable of controlling the display apparatus among the plurality of UI objects.

The controller may display on the display unit the UI object corresponding to the input device capable of controlling the display apparatus to distinguish the input device from the remaining UI objects when the connection of the input device is commenced and when the connection of the input devices is ended.

The UI object may be displayed in the form of at least one of an icon and a text.

The connection information may include information on a communication method between the plurality of input devices and the signal receiver.

The plurality of input devices may include one of a voice recognition device and a motion recognition device.

The connection information may include command information on either a voice or a motion corresponding to a particular input command.

The signal receiver may receive an input signal from the plurality of input devices by one of communication methods including Bluetooth, Wifi, Ethernet and Zigbee.

Another aspect may be achieved by providing a control method of a display apparatus, the control method including: receiving an input signal corresponding to a user's input, from at least one of a plurality of input devices capable of controlling the display apparatus by receiving the user's input; and displaying connection information which displays at least one of the plurality of input devices capable of controlling the display apparatus through the user's input.

The control method may further include identifying whether the plurality of input devices are capable of controlling the display apparatus through the user's input.

The displaying the connection information may include displaying the UI object corresponding to the input device capable of controlling the display apparatus, among the plurality of UI objects corresponding to the plurality of input devices.

The UI object corresponding to the input device capable of controlling the display apparatus may be displayed so as to distinguish from the remaining UI objects when the connection of the input device is commenced and when the connection of the input device is ended.

The UI object may be displayed as one of an icon and a text.

The connection information may include information on a communication method for the input device.

The plurality of input devices may include one of a voice recognition device and a motion recognition device.

The connection information may include command information on one of a voice and a motion corresponding to a particular input command.

The display apparatus may receive an input signal from the input devices by one of communication methods including Bluetooth, Wifi, Ethernet and Zigbee.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 3 illustrates a screen which displays a user interface (UI) object according to the exemplary embodiment;

DETAILED DESCRIPTION OF EXEMPLARY EMBODIMENTS

Figure 1:
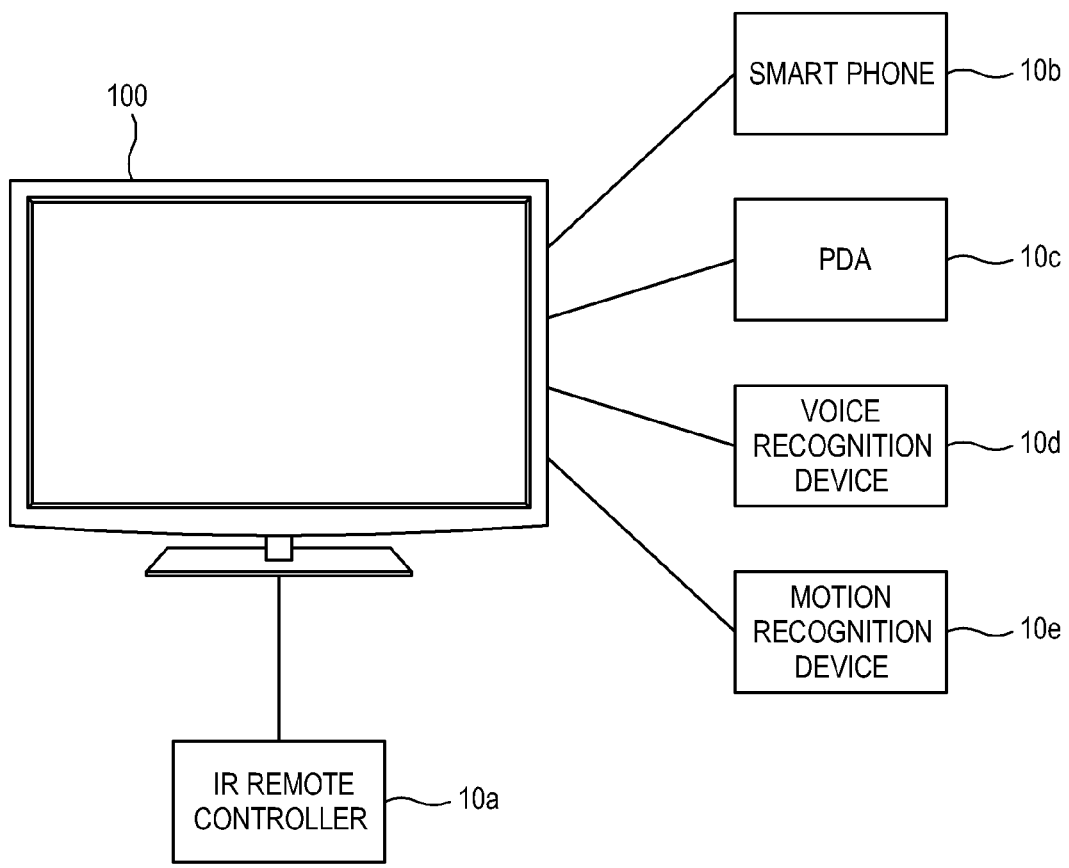
FIG. 1 illustrates a plurality of input devices which are connected to a display apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a plurality of input devices 10 which are connected to a display apparatus 100 according to an exemplary embodiment.

As shown therein, the display apparatus 100 may receive an input signal from a variety of input devices 10 including an IR remote controller 10a, a smart phone 10b, a PDA 10c, a voice recognition device 10d and a motion recognition device 10e. An input signal which is input by the input devices 10 may be transmitted in a respective signal format corresponding to the respective input devices 10. The display apparatus 100 may include a plurality of communication modules to receive an input signal from the respective input devices 10.

The input devices 10 provide various functions as well as a function of controlling the display apparatus 100. The input devices 10 may perform their functions as a remote input device and receive a user's input with hardware and/or by execution of applications. A user's input to the input devices 10 may include an on/off command for the display apparatus 100, change of channel or volume, commands relating to video recording of a content, and a user's input for controlling the display apparatus 100.

Figure 2:
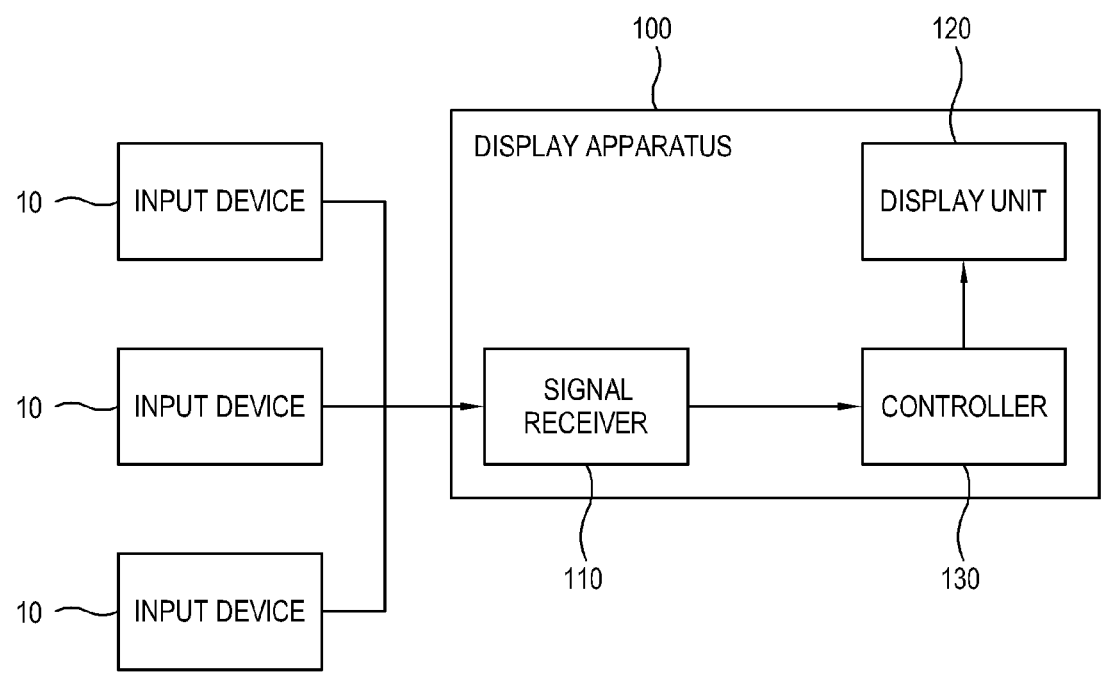
FIG. 2 is a block diagram of a display apparatus according to the exemplary embodiment.

FIG. 2 is a block diagram of the display apparatus 100 according to the exemplary embodiment.

The display apparatus 100 includes a signal receiver 110, an image processor (not shown), a display unit 120, and a controller 130. The display apparatus 100 may receive an input signal from a plurality of input devices 10, and may be controlled by an input signal received. The display apparatus 100 may include TV, monitor, etc., but is not limited thereto.

The signal receiver 110 receives an input signal corresponding to a user's input from at least one of the plurality of input devices 10. The signal receiver 110 may receive an input signal from the input devices 10 by various communication methods including Bluetooth, Wifi, Ethernet and Zigbee, and may include a wireless communication module corresponding to each communication method.

The image processor processes an image to be displayed on the display unit 120. The image processing by the image processor may include decoding, scaling, etc.

The display unit 120 receives an image signal from the image processor, and displays an image according to the image signal. The display unit 120 may include a display panel (not shown) to display an image thereon and a panel driver (not shown) to process an input image signal and allow an image to be displayed on the display panel.

The display unit 120 may display thereon information on the plurality of input devices 10 by control of the controller 130 (to be described later). The information on the input devices 10 may include a name, communication method, connection information of the input devices 10, and may be displayed in various forms.

The controller 130 performs overall operation controls for the display apparatus 100. The controller 130 may include a control program; a non-volatile memory such as a read only memory (ROM) storing the control program therein and a flash memory; a volatile memory such as a random access memory (RAM) loading at least a part of the stored control program; and a microprocessor such as a central processing unit (CPU) executing the loaded control program and a micro control unit (MCU).

The controller 130 searches for the plurality of input devices 10 capable of transmitting an input signal, and identifies whether the plurality of searched input devices 10 are capable of controlling the display apparatus 100 through a user's input. For example, if an input device 10 includes a smart phone which has an application installed therein for the execution of functions capable of controlling the display apparatus 100, the display device 100 may receive a user's input through the smart phone. If an input device 10 includes Bluetooth, it should pair with the display apparatus 100 to receive a user's input. In case of Bluetooth, signal transmission and reception may not be performed due to a distance between the input device 10 and the display apparatus 100. The controller 130 may request for information on whether the input device 10 is capable of controlling the display device 100 by receiving a user's input to thereby identify the capability of the input device 10. The controller 130 may store history information on the input device 10 connected already.

The controller 130 displays on the display unit 120 connection information displaying at least one of the plurality of input devices 10 capable of controlling the display apparatus 100 through a user's input. The connection information may include a display for distinguishing each input device 10, connection/non-connection of the input devices 10 and the display apparatus 100 and information on the name of each input device 10. The connection information may further include information on a communication method between the input devices 10 and the signal receiver 110 such as wired communication, IR, Bluetooth, Wifi, Ethernet and Zigbee. The connection information may be displayed as a plurality of user interface (UI) objects in the form of icons or texts (to be described later).

The exemplary embodiment regarding displaying the connection information on the display unit 120 will be described with reference to FIGS. 3 to 5.

FIG. 3 illustrates a screen which displays UI objects 200 according to the exemplary embodiment.

As shown therein, the connection information may include a plurality of UI objects 210, 220, 230 and 240 corresponding to the plurality of input devices 10. The controller 130 may display on the display unit 120 the UI object corresponding to the input devices 10 and may display the UI of the input device capable of controlling the display apparatus 100 differently from the other UI so as to distinguish the UI capable of controlling the display apparatus 100 from the remaining UI objects. In this case, the UI objects 200 may be displayed in the form of either an icon or a text.

The display unit 120 displays thereon the plurality of UI objects 210, 220, 230 and 240 together with an image. Each of the UI objects 210, 220, 230 and 240 corresponds to each of the plurality of input devices 10. The UI objects are different from each other and are displayed corresponding to an input device which is capable of controlling the display apparatus 100 through a user's input and an input device which is not capable of controlling the display apparatus 100 through a user's input. For example, if the controller 130 identifies that only a smart phone connected to an IR remote controller by Bluetooth is capable of receiving a user's input, the controller 130 may display enlarged images of the UI objects 210 and 220 corresponding to the input device 10 as illustrated in FIG. 3. Furthermore, the controller 130 may display reduced images of the UI objects 230 and 240 corresponding to a voice recognition device and a motion recognition device which are not capable of controlling the display apparatus 100 through a user's input so as to distinguish the capable and incapable input devices 10. Alternatively, the controller 130 may display the UI objects in different colors or enlarge the UI objects, or locate the capable UI object, separately from the remaining UI objects, or in any other form as long as it is possible to distinguish the input devices capable of controlling the display apparatus 100 from those incapable of controlling the display apparatus 100.

Figure 4A:
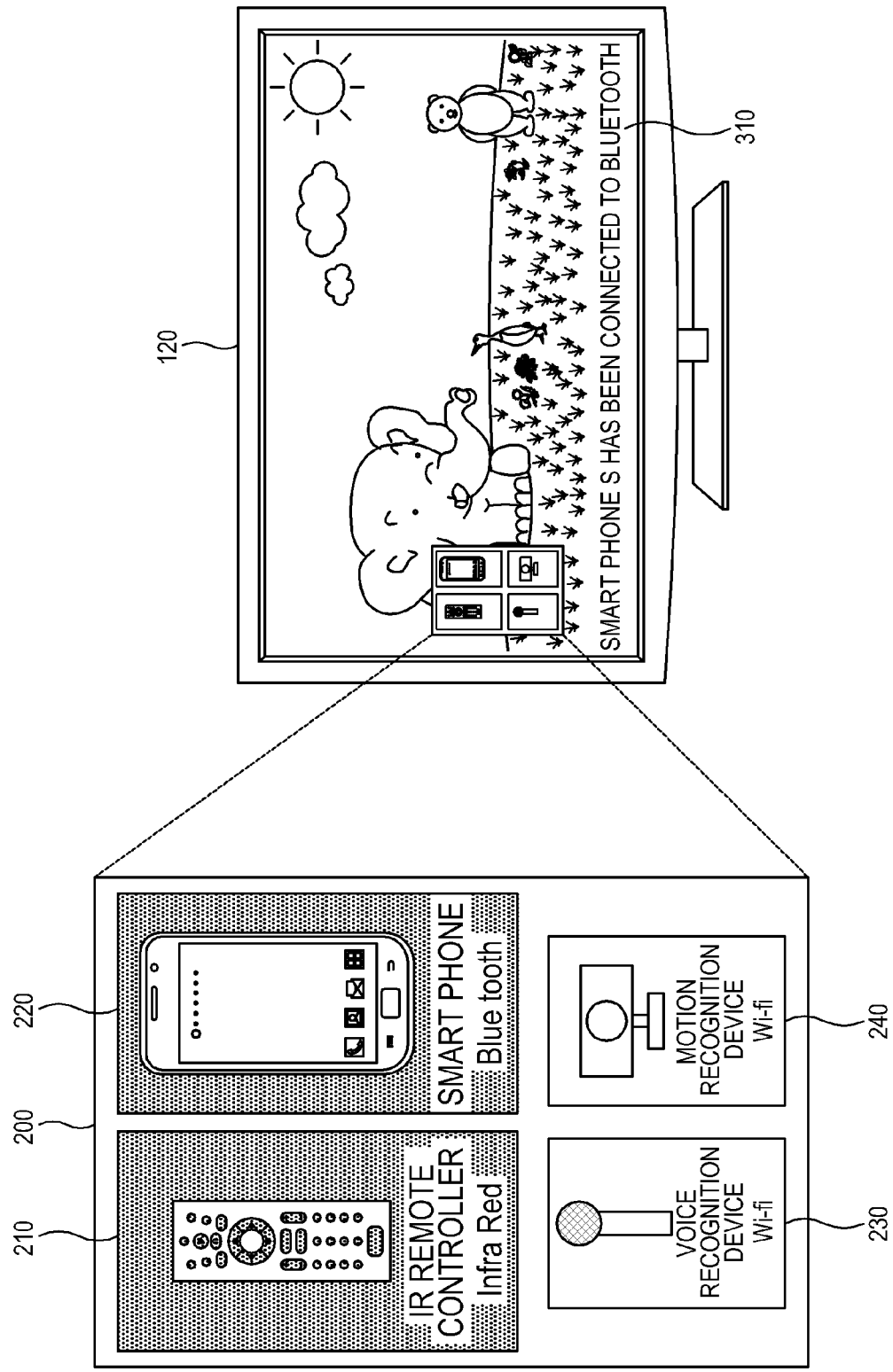
FIGS. 4A and 4B illustrate a screen which displays a UI object when a connection of each input device is commenced or when a connection of each input device is ended according to the exemplary embodiment.
Figure 4B:
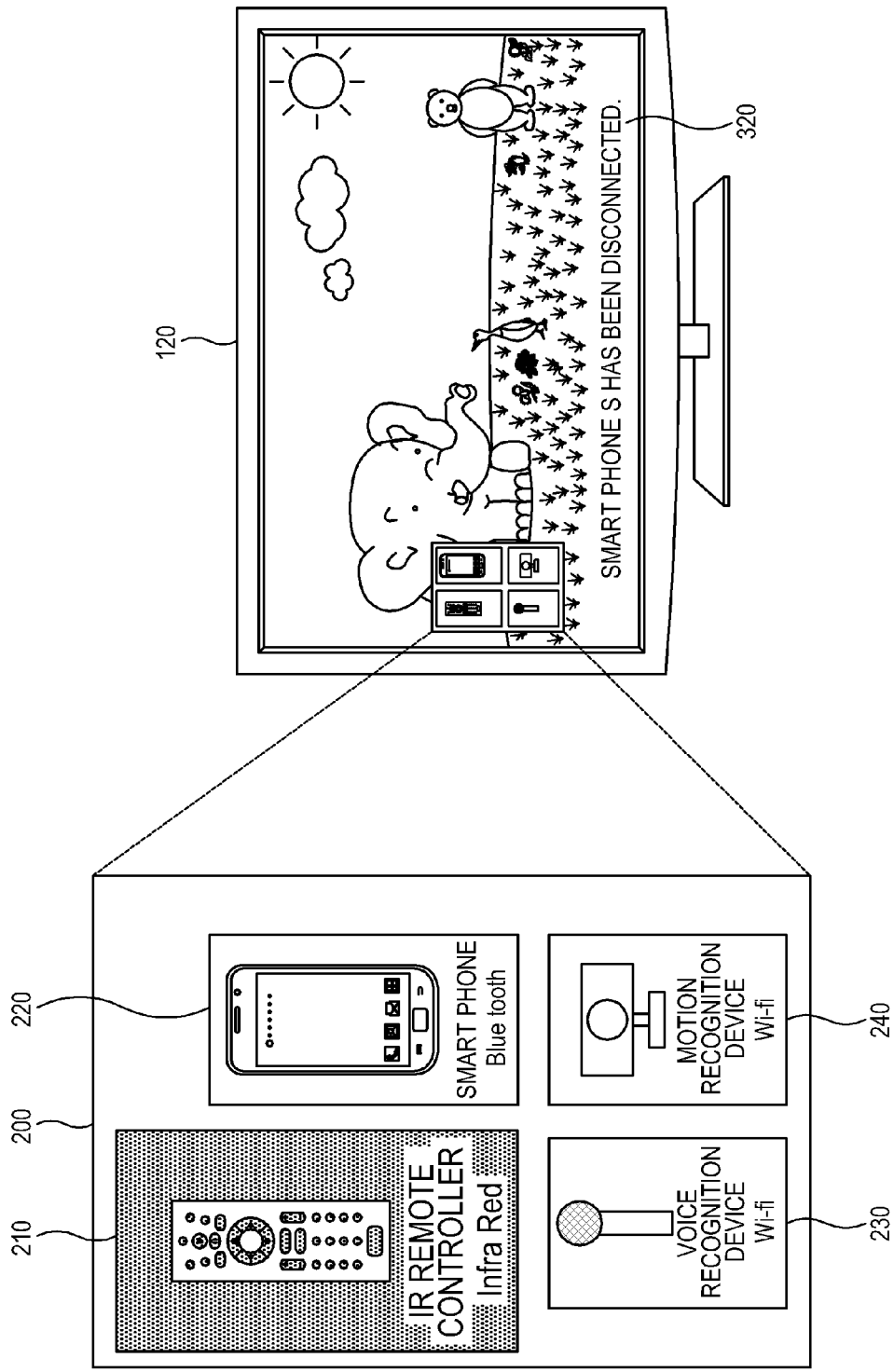

FIGS. 4A and 4B illustrate a screen which displays UI objects 200 when a connection of each input device 10 is commenced or ended according to the exemplary embodiment.

When a connection of each input device 10 is commenced or ended, the controller 130 may display on the display unit 120 a UI object corresponding to the input device to be distinguished from the remaining UI objects. For example, as shown in FIG. 4A, if a first input device (smart phone) is paired with the display apparatus 100 by Bluetooth, an application for receiving and transmitting to the display apparatus 100 a user's input command is executed and an UI object 220 corresponding to the first input device is displayed on the display unit 120 to distinguish from other UI objects 230 and 240 corresponding to input devices 10 which are incapable of receiving an input signal, upon commencement of connection. In this case, an extra text 310 which includes information on the commencement of the connection of the input device 10 may be also displayed on the display unit 120.

As shown in FIG. 4B, if the connection is ended as a result of ending the pairing of the first input device and the display apparatus 100 and of ending execution of the application, the UI object 220 corresponding thereto is changed to the form as before the connection. In this case, an extra text 320 is displayed on the display unit 120 which includes information on ending of the connection of the input device 10.

Figure 5:
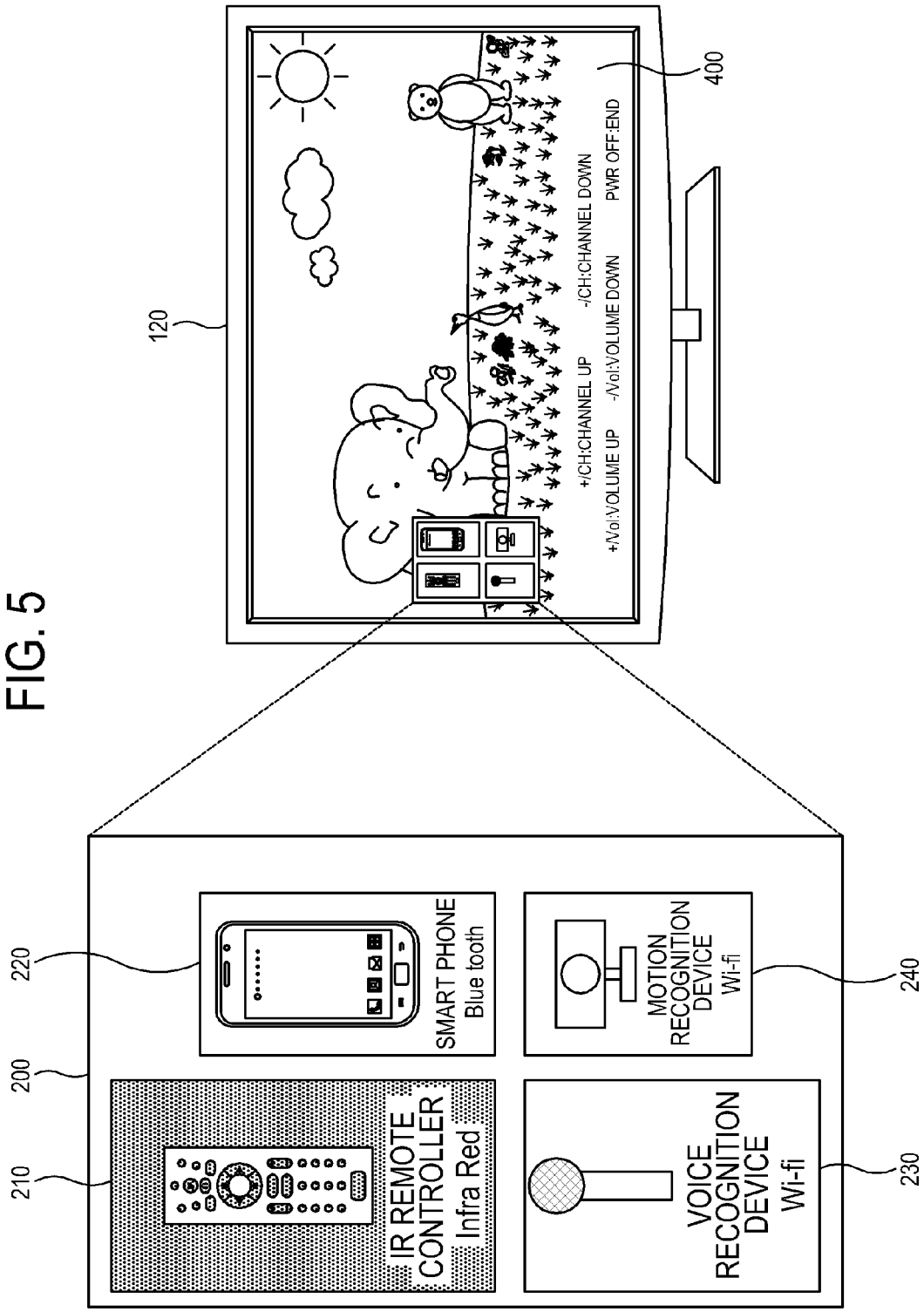
FIG. 5 illustrates a screen which displays command information on a voice recognition device or motion recognition device according to the exemplary embodiment.

FIG. 5 illustrates a screen which displays command information on a voice recognition device or a motion recognition device according to the exemplary embodiment.

The input device 10 may include either a voice recognition device 10d (230) or a motion recognition device 10e (240). The voice recognition device 10d recognizes a user's voice and automatically analyzes a syllable equivalent to a user's voice by a known voice recognition algorithm. If it is determined that a syllable corresponding to a preset input command is consistent with the user's voice, the voice recognition device 10e transmits an input signal corresponding to the command to the display apparatus 100. The controller 130 controls the display apparatus 100 according to the transmitted input signal. Then, the display apparatus 100 may display command information 400 on a voice corresponding to the particular input command for user's convenience.

For example, if a voice corresponding to a command for increasing volume of the display apparatus 100 is set as "volume up", and a voice corresponding to a command for turning off power is set as "end", the controller 130 may display the command information 400 on the voice in a lower part of the display unit 120.

The motion recognition device 10e recognizes a user's motion and automatically analyzes a particular command equivalent to a user's motion by a known motion recognition algorithm, and transmits an input signal corresponding to the command to the display apparatus 100. The controller 130 controls the display apparatus 100 according to the transmitted input signal. Then, the display apparatus 100 may display command information on a motion corresponding to the particular input command.

Figure 6:
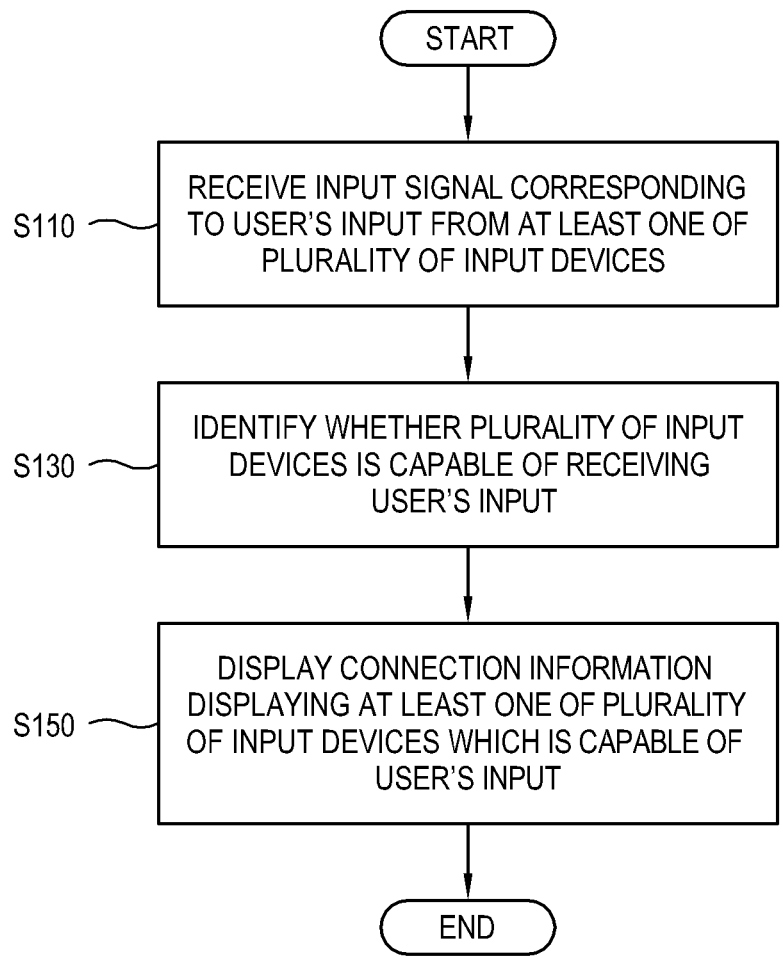
FIG. 6 is a control flowchart of the display apparatus according to the exemplary embodiment.

FIG. 6 is a control flowchart of the display apparatus 100 according to the exemplary embodiment.

The display apparatus 100 receives an input signal corresponding to a user's input from at least one of the plurality of input devices 10 from which it is capable of receiving a user's input (S110). The input signal which is input by the input devices 10 may be transmitted in each signal format corresponding to the input devices 10. The display apparatus 100 may include a plurality of communication modules to receive an input signal from the input devices 10.

The display apparatus 100 displays connection information displaying at least one of the plurality of input devices 10 from which it is capable of receiving a user's input (S150). The connection information may include a display which distinguishes each input device 10, connection/non-connection of the input devices 10 and the display apparatus 100, and a name of the input devices 10. The connection information may further include communication methods between the input devices 10 and the display apparatus 100 including a wired communication, IR, Bluetooth, Wifi, Ethernet and Zigbee. The connection information may be displayed as a plurality of UI objects in the form of an icon or a text (to be described later).

The display apparatus 100 identifies whether the plurality of input devices 10 from which it is capable of receiving a user's input to thereby display the connection information (S130). The display apparatus 100 may request for information on whether the input devices 100 from which it is capable of receiving a user's input for such identification. The display apparatus 100 may store history information on the input devices 10 connected already.

The display apparatus 100 may display a UI object corresponding to the capable input device 10 among the plurality of UI objects corresponding to the plurality of input devices 100 to be distinguished from the remaining UI object. The UI object may be displayed in the form of either an icon or a text. The form which is displayed to be distinguished from other UI objects has been described above, but is not limited thereto and other forms of distinguishing the UI objects may be provided.

The display apparatus 100 may display the UI object corresponding to the input devices 10 to be distinguished from the remaining UI objects when the connection of the input devices 10 is commenced or ended. In this case, an extra text on the commencement or ending of the connection of the input devices 10 may be displayed together with the text.

The input device 10 which transmits the input signal to the display apparatus 100 may include either the voice recognition device or the motion recognition device. The process of analyzing a particular command from a user's voice or motion and transmitting the analysis result to the display apparatus 100 by the voice recognition device or the motion recognition device is the same as that which has been described above with reference to FIG. 5. In this case, the connection information may include command information on either the voice or motion corresponding to the particular input command.

As described above, a display apparatus and a control method thereof displays information of a plurality of input devices which are capable of controlling the display apparatus making it convenient for a user to determine which input device is being used.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus controllable through at least one of a plurality of types of input devices, the display apparatus comprising:
    a storage which stores a plurality of graphical images corresponding to the plurality of types of user controlled input devices, respectively;
    a signal receiver which receives an input signal corresponding to a user's input to a user controlled input device, from at least one of the plurality of types of user controlled input devices;
    a display; and
    a controller which identifies a type of the user controlled input device from which the input signal is received by the signal receiver, and displays one of the plurality of graphical images corresponding to the identified type of the user controlled input device based on when the input signal is received from the user controlled input device,
    wherein each of the plurality of graphical images comprises a graphical representation and a name of the user controlled input device.

2. The display apparatus according to claim 1, wherein the controller displays connection information comprising a plurality of user interface (UI) objects corresponding to each of the plurality of types of the user controlled input devices, and the controller displays on the display unit a UI object corresponding to the user controlled input device differently from the remaining plurality of UI objects.

3. The display apparatus according to claim 2, wherein the controller displays on the display unit the UI object corresponding to the user controlled input device differently from the remaining UI objects when the connection of the user controlled input device is commenced and when the connection of the user controlled input device is ended.

4. The display apparatus according to claim 3, wherein the UI object is displayed as one of an icon and a text.

5. The display apparatus according to claim 2, wherein the connection information comprises information on a communication method between the plurality of types of user controlled input devices and the signal receiver.

6. The display apparatus according to claim 2, wherein the connection information comprises command information on either a voice or a motion corresponding to a particular input command.

7. The display apparatus according to claim 1, wherein the plurality of types of user controlled input devices comprise one of a voice recognition device and a motion recognition device.

8. The display apparatus according to claim 1, wherein the signal receiver receives an input signal from the plurality of the types of user controlled input devices by one of communication methods comprising Bluetooth, Wifi, Ethernet and Zigbee.

9. The display apparatus according to claim 1, wherein the controller does not display the plurality of graphical images which do not correspond to the identified type of the user controlled input device.

10. The display apparatus according to claim 1, wherein the controller displays different images of the plurality of graphical images along with the one of the plurality of graphical images corresponding to the identified type of the user controlled input device, the one image being distinguished from the different images.

11. A control method of a display apparatus, the control method comprising:
    storing a plurality of graphical images corresponding to a plurality of types of user controlled input devices, respectively;
    receiving an input signal corresponding to a user's input, from at least one of the plurality of types of user controlled input devices;
    identifying a type of the user controlled input device from which the input signal is received; and displaying one of the plurality of graphical images corresponding to the identified type of the user controlled input device based on when the input signal is received from the input device,
    wherein each of the plurality of graphical images comprises a graphical representation and a name of the user controlled input device.

12. The control method according to claim 11, further comprising identifying whether the plurality of types of user controlled input devices are capable of controlling the display apparatus through the user's input.

13. The control method according to claim 12, wherein the displaying comprises displaying connection information comprising a plurality of user interface (UI) objects corresponding to each of the plurality of types of the user controlled input devices, and displaying a UI object corresponding to the user controlled input device differently from among the remaining plurality of UI objects.

14. The control method according to claim 13, wherein the UI object corresponding to the user controlled input device is displayed differently from the remaining plurality of UI objects when the connection of the user controlled input device is commenced and when the connection of the user controlled input device is ended.

15. The control method according to claim 14, wherein the UI object corresponding to the user controlled input device is displayed as one of an icon and a text.

16. The control method according to claim 13, wherein the connection information comprises information on a communication method for the plurality of types of user controlled input devices.

17. The control method according to claim 13, wherein the connection information comprises command information on one of a voice and a motion corresponding to a particular input command.

18. The control method according to claim 11, wherein the plurality of types of user controlled input devices comprise one of a voice recognition device and a motion recognition device.

19. The control method according to claim 11, wherein the display apparatus receives an input signal from the plurality of types of user controlled input devices by one of communication methods comprising Bluetooth, Wifi, Ethernet and Zigbee.

20. A display apparatus comprising:
    a controller which searches for a plurality of user controlled input devices capable of transmitting an input signal to the display apparatus, and which identifies a type of the user controlled input device from which the input signal is received;

a display unit which displays thereon one of the plurality of graphical images corresponding to the identified type of the user controlled input device based on when the input signal is received from the user controlled input device; and a signal receiver which receives the input signal from at least one of the plurality of user controlled input devices, wherein each of the plurality of graphical images comprises a graphical representation and a name of the user controlled input device.

21. The display apparatus according to claim 20, wherein the controller displays on the display unit connection information which comprises a plurality of user interface (UI) objects corresponding to each of the plurality of user controlled input devices, wherein a UI object, corresponding to the at least one of the plurality of user controlled input devices is displayed differently from the remaining plurality of UI objects.

* * * * *